United States Patent [19]

Schafer

[11] 3,835,417
[45] Sept. 10, 1974

[54] METHOD AND MEANS FOR EXCITING LIQUID LASERS

[75] Inventor: Fritz Peter Schafer, Gottingen-Nikolausberg, Germany

[73] Assignee: Carl Zeiss-Stiftung, Wuerttemberg, Germany

[22] Filed: June 19, 1973

[21] Appl. No.: 371,361

Related U.S. Application Data

[63] Continuation-in-part of Ser. No. 120,531, March 3, 1971, abandoned.

[52] U.S. Cl. ... 331/94.5 L, 252/301.2, 331/94.5 PE
[51] Int. Cl. ............................................. H01s 3/00
[58] Field of Search ............... 331/94.5 L, 94.5 PE; 252/301.2

[56] References Cited
UNITED STATES PATENTS

| | | | |
|---|---|---|---|
| 3,457,523 | 7/1969 | Wesselink | 331/94.5 |
| 3,521,187 | 7/1970 | Snavely | 331/94.5 |
| 3,534,287 | 10/1970 | Heller | 331/94.5 |
| 3,582,814 | 6/1971 | Dugay et al. | 331/94.5 |

Primary Examiner—Edward S. Bauer
Attorney, Agent, or Firm—Sandoe, Hopgood & Calimafde

[57] ABSTRACT

Liquid lasers are excited by generating a flow of electric current through a laser-cell liquid which comprises a solute capable of fluorescing when subjected to the current and dissolved in an aprotonic (also known as an aprotic) solvent. The ions of said solute serve as the carrier ions of the current. More than one solute may be used, in which case, the added solute is excitable to selective emission by transfer of energy from the first solute, and its fluorescence contributes to the ability of the first solute to effect laser emission.

10 Claims, 1 Drawing Figure

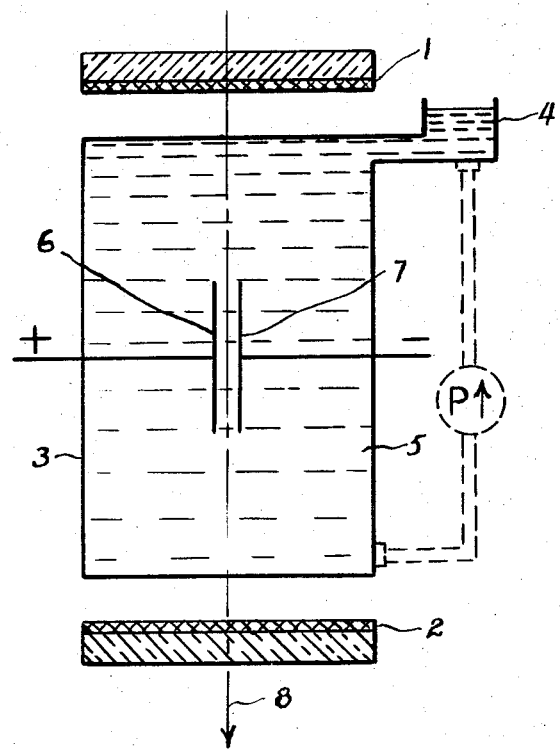

METHOD AND MEANS FOR EXCITING LIQUID LASERS

This application is a continuation-in-part of application Ser. No. 120,531, filed Mar. 3, 1971 and now abandoned.

It is common practice and prior art to pump liquid lasers by means of flash tubes or also with the air of other lasers, primarily solid-state lasers. In such practice, electrical energy is converted into radiant energy, which is then used to excite the laser substance.

Apart from the low efficiency achieved in such practice, technical difficulties are encountered in the prior pumping methods; for example, the short life and lack of reliability of flash tubes represent important limitations.

It is possible to design liquid lasers, especially dye lasers, which are very small so that the substance being excited can therefore be of very small volume. But prior art pumping devices are not suited to the excitation of such small lasers.

It is an object of this invention to provide an improved method and means for exciting liquid lasers. Specifically, it is an object that such improvement be marked by high technical reliability and longevity, by improved operating mechanism, and by adaptability to the excitation of small volumes of excited substance.

Briefly, the method of the invention contemplates exciting liquid lasers by generating a flow of electric current through the laser liquid which consists of a dyestuff solute dissolved in an aprotonic (also known as an aprotic) solvent, the ions of the dissolved dyestuff being the carrier ions of the flow of current and being capable of fluorescing under the action of the current.

The dissolved solute is preferably a dyestuff, it being understood that by dyestuff is meant substances having conjugated double bonds, and therefore including both aromatics and polyenes. Typical examples of dyestuffs which are fluorescent under the action of the current and which can be used in the method of the invention are as follows: 9, 10 - Diphenylanthracene; 2, 5 - Dimethylanthracene; 1, 2, 7, 8 - Dibenzochrysene; 2, 5 - Bis (4.-diethylaminophenyl) oxadiazol - 1, 3, 4; 7 - Diethylamino - 4 - methylcoumarin; 4 - Methylumbelliferon; Coronen; Rubicene. Additional examples are well known in chemical literature and will be obvious to those skilled in the art.

As previously stated, the laser liquid consists preferably of a dyestuff which is dissolved in an aprotonic solvent. Aprotonic or aprotic solvents are well known in chemical literature and satisfy the requirement that the decomposition voltage of the solvent is higher than the ionization voltage of the substance dissolved therein. This means that upon applying a voltage to a cell which contains a solute dissolved in an aprotonic solvent, no ions of the solvent are formed. However, as a result of electrode reaction, cations and anions of the solute are formed which are then the carriers of the current. Aprotonic solvents, therefore, are not decomposed upon the passage of the required current.

Thpical examples of aprotonic solvents are dimethylformamide (DMF), dimethyl sulfoxide (DMSO), acetonitrile, tetramethyl urea, carbon tetrachloride and methylpyrrolidone. Additional examples are well known in chemical literature and will be obvious to those skilled in the art.

According to the invention, the current applied to to the laser liquid is preferably direct current. The field strength between the electrodes submerged in the laser liquid is selected as high as possible and is limited only by the breakdown strength of the solvent used, e.g., 20 to 100 kv/cm can be used advantageously.

Under the action of this field strength, a flow of current is caused through the laser liquid. Therefore, cations produced at the anode in an electrode reaction, and anions concurrently produced at the cathode, are transferred through the field in opposite directions; upon collision of anions and cations, molecules are formed in the first excited singlet state in a recombination reaction, whence a laser transition to the ground state can be effected. The threshold of laser emission in many cases is reached when about 5 percent of the molecules are in the excited state. In order to be able to maintain this population on a steady basis, the flow of current through the liquid must attain very high values, in the order of magnitude of 100 amperes. Such high current strengths are attainable by pulse techniques with relative ease.

An illustrative apparatus embodying the invention is characterized by a liquid cell positioned between the mirrors or an optical resonator, and by two electrodes in the cell and connected to a voltage supply.

Advantageously, the apparatus is designed so that the liquid cell contains a solvent and at least two substances able to fluoresce, and one of these substances is excitable to selective emission by the transfer of energy from the other substance. In this event, energy is transferred in one or several steps, radiantly or without radiation, from the electrochemically excited molecules (of the first substance) to the molecules of the other substance, and it is the latter molecules which finally effect laser emission. The molecules of this other substance need not necessarily have the same chemical character as the first-excited molecules.

An illustrative embodiment of this invention will now more fully be described with reference to the accompanying drawing, which is a simplified and diagrammatic longitudinal sectional view through the apparatus.

In the drawing, reference numerals 1 and 2 designate the resonator mirrors of an optical resonator. Reference numeral 3 designates a cell for liquid 5 which is in communication with an expansion vessel 4. Alternatively, a circulating system including a reservoir and a pump may be provided instead of the expansion vessel to circulate the liquid 5, for cooling purposes and to reduce streaks; such alternative is suggested by dashed outlines in the drawing, namely, by a circulating pump P between cell-outlet means and cell-inlet means, the latter being shown at the reservoir or expansion vessel 4.

In a specific illustrative example, the liquid in cell 3 contains the dye 9, 10 - diphenylanthracene (DPA) dissolved in an aprotonic solvent, such as dimethylformamide (DMF). The cell 3 accommodates two plate-like electrodes 6–7 facing each other in parallel relation and on opposite sides of the laser axis; electrodes 6–7 are spaced from each other by a small distance in the order of approximately 1 mm. The two electrodes may be of stainless steel, and in one embodiment they had effective areas of 0.1 cm by 1.5 cm, being elongated in the direction of the laser axis. A high dc voltage is applied to the electrodes 6–7, such voltage being limited essentially only by the dielectric strength of the solvent used. This voltage is relied upon to maintain continuous laser action, once started by a single pulse of greater voltage.

Upon flow of current through the liquid 5, cations are produced at the anode in an electrode reaction, according to the relation $DPA - e^\theta \rightarrow DPA^\theta$; at the same time, anions are produced at the cathode, according to the relation $DPA + e^\theta \rightarrow DPA^\theta$. Cations and anions are transferred through the field in opposite directions and, upon impacting, create molecules in the first excited singlet state in a recombination reaction, according to the relation $DPA^\theta + DPA^\theta \rightarrow DPA^* + DPA$; a laser transition is effected from this excited state to the ground state. The resulting laser radiation then leaves the optical resonator in the direction of arrow 8.

For the situation in which laser emission results from the cascaded excitation of more than one solute, 9-aminoacridine (AA) may be added to the aforementioned solvent (DMF) and solute (DPA). The added solute (AA) is excitable to selective emission by the transfer of energy from the first solute (DPA), and its fluorescence materially contributes to the ability of the DPA alone to effect laser emission.

It will be seen that the described method and apparatus meet the stated objects, and in particular that the technique is well suited to excitation of volumes that are so small as to be beyond the useful application of flash tubes.

What is claimed is:

1. The method of exciting liquid lasers which comprises generating a flow of electric current through a laser-cell liquid which comprises a solute dissolved in an aprotonic solvent, the ions of said solute being the carrier ions of said current and being able to fluoresce when subjected to said current.

2. The method of claim 1 in which the electric current is direct current flowing through the liquid.

3. The method of claim 2 in which the current flowing through the liquid is at very high values in the order of magnitude of 1000 amperes.

4. The method of claim 1, in which the laser-cell liquid includes a dielectric solvent, and in which a voltage gradient is applied across a selected region transverse to the laser axis and of magnitude limited essentially only by the dielectric strength of the solvent.

5. The method of claim 1, in which the laser-cell liquid also includes a second solute able to fluoresce, the first-mentioned solute being excitable to selective emission by the transfer of energy from the second-mentioned solute.

6. The method of claim 1, including the additional step of circulating the liquid in the region of current flow.

7. The method of claim 1 in which said solute is 9, 10-diphenylanthrascene.

8. The method of claim 7 in which the said solute is dissolved in dimethylformamide.

9. Liquid-laser apparatus comprising an optical resonator defined by spaced mirrors, a liquid cell having light transmitting ends and positioned on and surrounding the laser axis and in the space between said resonator mirrors, two electrodes in said cell and facing each other across the laser axis, said cell containing a liquid comprising an aprotonic solvent and a solute able to fluoresce, and means including conductors to said electrodes for external voltage-supply connection to said electrodes to cause said solute to fluoresce.

10. Apparatus according to claim 9, in which the liquid in said cell comprises, in addition to said aprotonic solvent, at least two substances able to fluoresce when subjected to the current, one of these substances being excitable to selective emission by the transfer of energy from the other substance.

* * * * *